United States Patent [19]

Landgrebe et al.

[11] Patent Number: 5,405,822
[45] Date of Patent: Apr. 11, 1995

[54] THERMAL TRANSFER CYAN DONOR ELEMENT

[75] Inventors: Kevin D. Landgrebe, Woodbury; Jeffrey C. Chang, North Oaks; Terrance P. Smith, Cottage Grove, all of Minn.

[73] Assignee: Minnesota Mining and Manufacturing Company, St. Paul, Minn.

[21] Appl. No.: 175,138

[22] Filed: Dec. 29, 1993

[51] Int. Cl.$^6$ ...................... B41M 5/035; B41M 5/38
[52] U.S. Cl. .................................... 503/227; 428/195; 428/913; 428/914
[58] Field of Search .................... 8/471; 428/195, 913, 428/914; 503/227

[56] References Cited

U.S. PATENT DOCUMENTS

| | | | |
|---|---|---|---|
| 3,898,086 | 8/1975 | Franer et al. | 96/28 |
| 4,281,115 | 7/1981 | Baumann | 542/441 |
| 4,720,480 | 1/1988 | Ito et al. | 503/227 |
| 4,808,568 | 2/1989 | Gregory et al. | 503/227 |
| 4,820,686 | 4/1989 | Ito et al. | 503/227 |
| 4,923,846 | 5/1990 | Kutsukake et al. | 503/227 |
| 4,990,484 | 2/1991 | Nakamura | 503/227 |
| 5,036,041 | 7/1991 | Kanto et al. | 502/227 |
| 5,077,264 | 12/1991 | Hayashi et al. | 503/227 |

FOREIGN PATENT DOCUMENTS 1-077583  3/1989  Japan .................... 503/227

OTHER PUBLICATIONS

ABSTRACTS: JP 61268495, 86.11.27, Dainippon Printing Ink—JP 62064595, 87.03.23, Dainippon Printing Ink—JP 1077583, 89.03.23, Sumitomo Chem Ind KK—JP 1077584, 89.03.23, Sumitomo Chem Ind KK—JP 3007387, 91.01.14, 92.03.18, Mitsubishi Kasei Corp.
61565 C.I. Solvent Green 3, Color Index, vol. III, 2nd Ed., p. 3497.
Chemistry in Britain Jan. 1989, "Electronic photography—the future", Peter Gregory.
Mitsubishi Kasei R&D Reivew, 3, (2), 71–80 (1989) *Dyes For Sublimation Type Heat-Sensitive Transfer Recording*, by Murata et al.
Scientific Aspects of Transfer Printing, JSDC May 1977, Griffiths and Jones.
JSDC Dec. 1969; Bent, Flynn and Sumner—"A New Insight into the Thermofix Dyeing of Polyester—Cellulose Blends I-Investigation of Mechanism of Transfer of Disperse Dyes".
Research Disclosure Dec. 1990—32019 "Thermal Dye Transfer" by W. Janssens and L. Vanmaele of Agfa-Gevaert naamloze vennootschap.
"Dyes of heat transfer printing" by J. Aihara, K. Nishida and M. Miyatake, American Dyestuff Reporter Feb. 1975.

*Primary Examiner*—B. Hamilton Hess
*Attorney, Agent, or Firm*—Gary L. Griswold; Walter N. Kirn; Mark A. Litman

[57] ABSTRACT

1. A thermal dye transfer imaging element comprising a continuous layer of a mixture of two or more dyes comprising at least one blue dye having a central nucleus represented by the following formula (I):

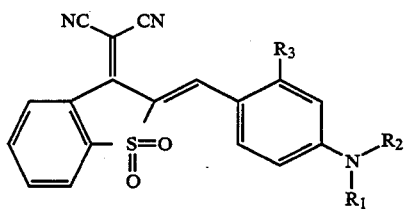

wherein $R_1$ and $R_2$ each represents a hydrogen atom or C1–C16 alkyl group, and $R_3$ represents a hydrogen atom of C1–C6 alkyl group and at least one green dye having a central nucleus represented by the following formula (II):

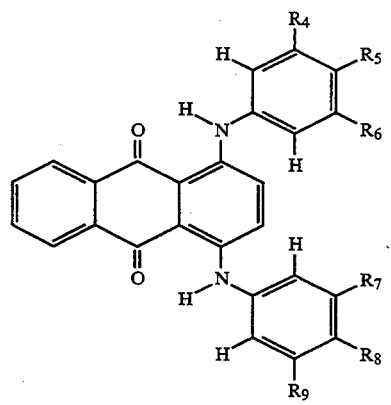

wherein $R_4$ through $R_9$ each represents a hydrogen atom, an alkyl group, an alkoxy group, an aralkyl group, or an aryloxy group in a polymeric binder, said mixture comprising up to 99% by weight of the total weight of dye and binder, said continuous layer being bonded to a substrate.

10 Claims, No Drawings

THERMAL TRANSFER CYAN DONOR ELEMENT

BACKGROUND OF THE INVENTION

1. Field of the Invention

This invention relates to novel thermal dye transfer constructions, and in particular to dye donor elements. This invention further relates to donor elements based on mixtures of green 1,4-bis(arylamino) anthraquinones with blue 3-dicyanomethylidene-2,3-dihydrothiophen-1,1-dioxide derivatives.

A further aspect of this invention is the provision of dye donor elements which, when imaged, give rise to dye images of excellent light fastness, high density, low hue error, and low turbidity, such images being useful for a variety of applications including color proofing.

2. Background of the Art

The term thermal transfer printing covers two main technology areas. In thermal transfer printing of textiles, a donor sheet is coated with a pattern of one or more dyes, contacted with the fabric to be printed, and heat is uniformly administered, sometimes with concomitant application of a vacuum. The transfer process has been much studied, and it is generally accepted that the dyes are transferred by sublimation in the vapor phase. Pertinent references include: C. J. Bent et al., *J. Soc. Dyers Colour.*, 85, 606 (1969); J. Griffiths and F. Jones, ibid., 93, 176, (1977); J. Aihara et al., *Am. Dyest. Rep.*, 64, 46, (Feb., 1975); and C. E. Vellins in "The Chemistry of Synthetic Dyes", K. Venkataraman, ed., Vol. VIII, 191, Academic Press, New York, 1978.

The other area covered by the term thermal printing is thermal imaging, where heat is applied in an imagewise fashion to a donor sheet in contact with a suitable receptor sheet to form a colored image on the receptor. In one embodiment of thermal imaging, termed thermal mass transfer printing, as described for instance in U.S. Pat. No. 3,898,086, the donor is a colorant dispersed in a wax-containing coating. On the application of heat, a donor layer in the construction melts or is softened, and a portion of the colored donor coating transfers to the receptor. Despite problems with transparency, pigments are generally the colorants of choice to provide sufficient light fastness of the colored image on the receptor. Another embodiment is termed variously thermal dye transfer imaging or recording, or dye diffusion thermal transfer. In this embodiment, the donor sheet comprises a dye in a binder. On imagewise application of heat, the dye, but not the binder, is transferred to the receptor sheet. A recent review has described the transfer mechanism as a "melt state" diffusion process quite distinct from the sublimation attending textile printing. [See: P. Gregory, *Chem. Brit.*, 25, 47 (1989)].

This same review emphasizes the great difficulty of finding or synthesizing dyes suitable for diffusive thermal transfer, stating that "It is significant that of the one million or so dyes available in the world, none were fully satisfactory". Among the failings of said dyes are inadequate light and heat fastness of the image and insufficient solubility of dyes for coating in the donor sheet. As has been noted previously, light fastness is also a problem in mass transfer imaging systems. In fact, achieving adequate light fastness is probably the single biggest challenge in these constructions. In large measure this is the result of the diffusive thermal transfer dye image being a surface coating a few microns thick. The dye is thus readily susceptible to photooxidative degradation. In contrast, textile fibers, which are 100 times thicker, are uniformly dyed throughout their depth, so that fading in the first few microns at the surface is of little practical importance. In consequence, it is common to find that dyes showing good light fastness in textile printing exhibit very poor photostability in diffusive thermal transfer imaging (see e.g., U.S. Pat. No. 4,808,568), and there remains a strong need for improved dyes for the latter application.

Although thermal printing of textiles bears a superficial resemblance to diffusive thermal dye imaging, they are in reality quite different processes with distinct properties and material requirements involved. Thermal printing occurs by a sublimation process, so that substantial vapor pressure is a prime criterion for dye selection. In diffusive dye imaging, high vapor pressure of the dye contributes to undesirable thermal fugacity of the image. For the melt state diffusion process involved in this situation, melting point is instead a better basis for dye selection. Diffusive dye transfer is a high resolution dry imaging process in which dye from a uniform donor sheet is transferred in an imagewise fashion by differential heating to a very smooth receptor, using heated areas typically of 0.0001 square inches or less. In contrast, the thermal printing of textiles is of comparatively low resolution, involving contemporaneous transfer by uniform heating of dye from a patterned, shaped or masked donor sheet over areas of tens of square feet. The typical receptors printed in this manner are woven or knitted fabrics and carpets. The distinct transfer mechanism allows such rough substrates to be used, while diffusive imaging, where receptors with a mean surface roughness of less than 10 microns are used, is unsuitable for these materials. Unlike diffusive thermal dye imaging, the transfer printing process is not always a dry process; some fabrics or dyes require pre-swelling of the receptor with a solvent or a steam post-treatment for dye fixation. Though the transfer temperatures for the two processes can be similar (180° to 220° C.), diffusive dye transfer generally operates at somewhat higher temperatures. However, in a manner strikingly reflective of the differences in mechanism involved, diffusive dye transfer involves times of around 5 msec, whereas thermal printing normally requires times of 15 to 60 sec. In accord with the sublimation process involved, thermal printing often benefits from reduced atmospheric pressure or from flow of heated gas through the donor sheet. Thermal printing is a technology developed for coloring of textiles and is used to apply uniformly colored areas of a predetermined pattern to rough substrates. In contradistinction, diffusive dye transfer is a technology intended for high quality imaging, typically from electronic sources. Here, a broad color gamut is built with multiple images from donors of the three primary colors onto a smooth receptor. The different transfer mechanism allows the requirement for grey scale capability to be fulfilled, since the amount of dye transferred is proportional to the heat energy applied. In thermal printing grey scale capability is expressly shunned, because sensitivity of transfer to temperature decreases process latitude and dyeing reproducibility.

It has now been found that mixtures of blue 3-dicyanomethylidene-2,3-dihydrothiophen-1,1-dioxide derivatives and green 1,4-bis(arylamino) anthraquinones (the "Colour Index" identifies one of these derivatives, 1,4-bis(tolylamino) anthraquinone as Solvent Green 3) can be beneficially used in thermal dye transfer imaging. When these dye mixtures are used to prepare cyan dye donor constructions, the resultant transferred images exhibit improved light fastness and lower hue error and lower turbidity over comparable materials known in the art.

The thermal printing art, in teaching the use of production of full color images [*Mitsubishi Kasei R & D Review*, 3, (2), 71-80 (1989)], states that "in order to achieve a recorded good showing wide color reproduction range, it is necessary that the absorption spectral characteristics of the three primary color dyes be correct". It is noted that "each dye should absorb one third of the visible wavelength band while allowing the remaining ⅔ to be transmitted, and show high color purity, which does not allow overlapping of each absorption". Additionally, the prior art (e.g., U.S. Pat. No. 4,923,846) teaches that ". . . in heat transfer recording, if the color characteristics of the three colors of cyan, magenta, and yellow are not [low], the intermediate colors become turbid colors with low chroma, whereby no good color reproducibility can be obtained". In view of these disclosures, it is surprising that a green dye, such as a 1,4-bis(arylamino) anthraquinone, with absorption in the blue region of the visible spectrum, would be useful for preparation of cyan dye donor ribbons for dye diffusion transfer imaging with reduced hue error, and there is indeed very little mention of the use of green dyes in the dye diffusion transfer art.

*Research Disclosure* 32019 (Agfa-Gevaert, December 1990) lists ninety dyes, three of which are green 1,4-bis(arylamino) anthraquinones, which are used in dyeing fabrics and can also be used in thermal recording. No mention is made of their use as mixtures or their suitability for making cyan images.

Japanese Kokai 62-064,595 claims dyes for thermal printing that have inorganic/organic ratios less than or equal to 2.30, and lists 1,4-bis(4-methylphenylamino) anthraquinone, which is Solvent Green 3, as an example of such a dye. The same dye is listed as an example of a dye falling within both claims of Japanese Kokai 4-085,081 that specify a thermal donor sheet characterized by a diffusible dye having fluorescent character (emitting between 400-600 nm) and a binder comprising a whitening agent. Because of metamerism, fluorescence is undesirable in printing or recording applications, such as color proofing, where matching of colors is important. It is therefor unobvious that this anthraquinone dye could be used in a color proofing application. Solvent Green 3 is also disclosed in Japanese Kokai 61-268,495 which claims dyes for thermal printing having greater than or equal to five ring structures in the molecule and molecular weight greater than or equal to 350.

The 3-dicyanomethylidene-2,3-dihydothiophen-1,1-dioxide derivatives are well known in thermal transfer imaging, used alone and as mixtures. U.S. Pat. No. 5,036,041 lists several examples, each of which is used as a mixture with another dye whose wavelength of maximum absorption ($\lambda$max) is 660 nm or higher.

U.S. Pat. No. 4,990,484 claims mixtures of indoanilines and another dye with $\lambda$max between 560 and 700 and molecular weight greater than 345, and provides a 3-dicyanomethylidene-2,3-dihydothiophen-1,1-dioxide derivative as a component of the mixture in one example. U.S. Pat. No. 4,923,846 lists a dye of the same class as one preferable for making a cyan donor element, the image from which has specified hue error and turbidity.

A number of patents claim or disclose examples of 3-dicyanomethylidene-2,3-dihydothiophen-1,1-dioxide derivatives (these are blue dyes; Disperse Blue 354 is one example) used as mixtures with a 1-alkylamino-4-arylaminoanthraquinone derivatives (blue dyes), including Japanese Kokai 1-077,583 and 1-077,584 and U.S. Pat. Nos. 4,720,480 and 4,820,686. U.S. Pat. No. 5,077,264 claims the same mixture with an indoaniline dye included. Japanese Kokai 3-007,387 provides an example of this class of dye used to prepare a black dye diffusion transfer donor element.

SUMMARY OF THE INVENTION

This invention relates to novel thermal dye transfer constructions, and in particular to dye donor elements. This invention further relates to donor elements based on mixtures of green 1,4-bis(arylamino) anthraquinones with blue 3-dicyanomethylidene-2,3-dihydothiophen-1,1-dioxide derivatives.

A further aspect of this invention is the provision of dye donor elements which, when imaged, provide dye images of excellent light fastness, high density, low hue error and low turbidity, such images being useful for a variety of applications including color proofing.

This invention describes thermal dye transfer compositions (dye donors) which, when heated in an imagewise fashion, result in the imagewise transfer of dye to a receptor sheet. The compositions of the invention comprise a polymeric binder, a green 1,4-bis(arylamino) anthraquinone dye and a blue 3-dicyanomethylidene-2,3-dihydothiophen-1,1-dioxide derivative.

DETAILED DESCRIPTION OF THE INVENTION

The process of dye diffusion thermal transfer consists of contacting a dye donor sheet with a suitable receptor sheet and applying heat in an imagewise fashion to transfer the dye to the receptor. Generally, the transfer process involves temperatures from 150° C. up to 400° C. and times of a few milliseconds (e.g., from 1 to 100 milliseconds). Although if a laser is used as a heat source as described, for example, in GB 2,083,726, the heating times can be as short as 50 nanoseconds. In addition to providing an image of acceptable density and of correct color, the dye must provide good light fastness and heat stability in the image. It is particularly desirable that the dye transfers in proportion to the heat applied, so that a good grey scale of coloration can be obtained.

Thermal transfer imaging is a dry diffusive dye imaging process consisting essentially of the steps of: 1) intimately contacting a donor sheet comprising a dye with an acceptor sheet; 2) differentially heating the assembly with a source of thermal energy in an imagewise fashion thereby transferring the dye to the receptor sheet; and 3) separating the donor and acceptor sheets. The size of an individual differentially heated area (pixel) preferably ranges from about 1 to $7 \times 10^4$ micron$^2$. The transfer time may range from about 0.1 to 100 milliseconds in the case of a conventional resistive heating element. The transfer times for a laser heated system could be as fast as 50 nanoseconds. The donor sheet is capable of transferring an amount of dye proportional to the amount of thermal energy applied.

The preferred dye mixtures useful in the present invention may be generally described as a mixture of at least one dye represented by a central nucleus of the following formula (I):

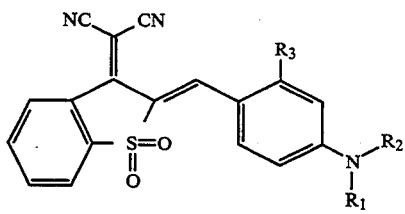

wherein $R_1$ and $R_2$ each represents a hydrogen atom or C1–C16 alkyl group that may be substituted, and $R_3$ represents a hydrogen atom or C1–C6 alkyl group and at least one dye represented by a central nucleus of the following formula (II):

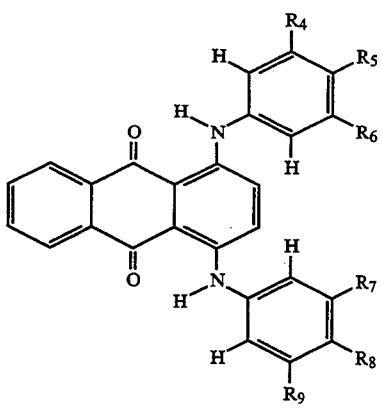

wherein $R_4$ through $R_9$ each represents a hydrogen, an alkyl group (e.g., of 1 to 20 carbon atoms, preferably 1 to 6 carbon atoms), an alkoxy group (e.g., of 1 to 20 carbon atoms, preferably 1 to 6 carbon atoms), an aralkyl group (e.g., of 7 to 20 carbon atoms, preferably 7 to 12 carbon atoms), or an aryloxy group (e.g., of 5 to 10 ring atoms selected from the group consisting of C, N, S, O, and Se, most preferably 5 or 6 atoms in the backbone of the ring selected from C, S, N, and O). Where the term "group" is used in defining a chemical species or component, it is understood that conventional substitution on that group is contemplated by the invention. For example, the term "alkyl group" covers not only unsubstituted alkyl such as methyl ethyl, hexyl, cyclohexyl, iso-octyl, and the like, but also includes hydroxylethyl, omega-chlorohexyl, 2-ethoxy-dodecyl, and the like. Where the term "alkyl" or "alkyl moiety" is used, no substitution is included within the use of that term. Similarly when a general structure is referred to as "a compound having the central nucleus of" a given formula, any substitution which does not alter the bond structure of the formula or the shown atoms within that structure, is included within that structure. For example, where there is a polymethine chain shown between two defined heterocyclic nuclei, the chain may be rigidized by a cyclic group, and substituent groups may be placed on the chain, but the conjugation of the chain may not be altered and the atoms shown in the heterocyclic nuclei may not be replaced. The description of a formula as "a general formula" does not specifically allow for such broader substitution of the structure.

It is preferred that the dyes be free of ionizable or ionic, water-solubilizing groups such as sulfo and carboxy and their salts.

The donor element may have a variety of structures, including a self-supporting single layer or a layer or coating on various substrates in combination with other layers, and may be used in a number of different imaging processes, including imaging with thermal print heads and with lasers.

The dye donor constructions of this invention provide transferred dye images that have excellent light fastness, high density, low hue error and low turbidity. The dye donor sheet used for this process comprises a dye ink coated on suitable substrate, though a self-sustaining film comprising the dye is also a possibility. The carrier sheet is preferably flexible, but may be rigid if the receptor layer is sufficiently flexible and/or conformable. The substrate may thus be glass, ceramic, metal, metal oxide, fibrous materials, paper, polymers, resins, and mixtures or layers of these materials, but preferably polymeric films. For backside thermal exposure with a thermal print head, example substrates include polyester, polyimide, polyamide, polyacrylate, polyalkylene and cellulosic films, and paper, especially the uniform high-quality paper known as condenser paper. It may be desirable to apply a backsize to the substrate on the side away from the dye to protect it from the heat source or to prevent sticking to the thermal element. The thickness of the resultant substrate may vary within wide limits depending on its thermal properties, but is generally below 50 microns, and preferably less than 12 microns and more preferably less than 10 microns. If a front thermal exposure is used, for instance when a laser irradiates the dye through a transparent receptor sheet, the substrate may be of arbitrary thickness.

The dye ink applied to the donor sheet comprises a mixture of two or more dyes as defined above, and usually a suitable binder. Other additives such as plasticizers, stabilizers, thermal absorbers, radiation absorbers or surfactants may also be present, as is known in the art. Suitable binders are polymeric materials such as: polyvinyl chloride and its derivatives; polyesters; celluloses, such as cellulose acetate, cellulose acetate butyrate, ethyl-cellulose and the like; epoxy resins; acrylates, such as polymethyl methacrylate; vinyl resins such as polyvinyl acetate, polyvinyl butyral, polyvinyl pyrrolidone and polyvinyl alcohol; polyurethanes; polysiloxanes; copolymers, such as those derived from polyacrylates or polyalkylene materials; and blends or mixtures of these various polymers. The dye may be present in the binder in the dissolved state, or it may be dispersed with at least some crystalline dye present. In some cases as little as 15% and as much as 99% by weight of dye may be used (with other additives excluding binder), but a more typical range could be about 90% to 15% by weight of dye. A preferred range is from 70% to 40% by weight of dye in multilayer constructions. A self-supporting element (e.g., without a distinct carrier layer) may contain 20% by weight of binder, and preferably as much as 40% by weight of binder.

In general, it is desired to formulate the donor such that the dye, but substantially none of the donor element binder, is transferred to the receptor. However, in some cases valuable constructions can be prepared in which the dye along with a significant, or indeed major, portion of the binder is transferred in a mass transfer process.

The receptor sheet may be transparent, translucent or opaque. It may be a single layer or a laminate. Particularly useful constructions can be made when the receptor is applied to a transparent polyester film or to a paper substrate. The receptor sheet may comprise a wide variety of polymers or their mixtures. Suitable materials are similar to those outlined above for the binder of the donor sheet.

Especially useful results can be obtained with receptors where the major component is sulfonated, hydroxy and epoxy functional vinyl chloride copolymer (eg. MR-120, Nippon Zeon Corporation). The receptor may additionally contain various additives, such as heat and light stabilizers or coating aids. While the exact nature of the receptor may influence the quality and fastness of the image, it has been found that the excellent stability of the dye mixtures of this invention is a property of the dye image itself and not of the receptor composition.

The object of providing stable thermally transferred cyan dye images with high density and low hue error and turbidity is achieved in this invention by the use of a mixture of two or more dyes comprising at least one dye represented by the following formula (I):

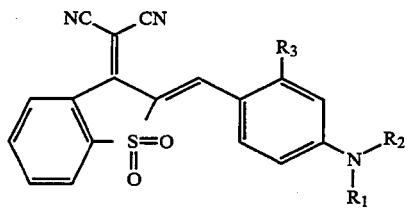

wherein $R_1$ and $R_2$ each represents a hydrogen atom or C1–C16 alkyl group that may be substituted, and $R_3$ represents a hydrogen atom or C1–C6 alkyl group and at least one dye represented by the following formula (II):

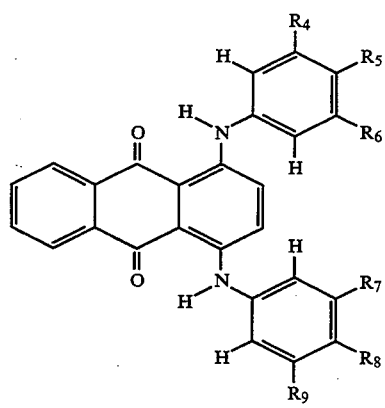

wherein $R_4$ through $R_9$ each represents a hydrogen atom, an alkyl group, an alkoxy group, an aralkyl group, or an aryloxy group. As is well known in this technical area, a large degree of substitution is not only tolerated, but is often advisable. The phrases "alkyl group" and "alkoxy group" are intended to include not only pure hydrocarbon alkyl chains such as methyl, ethyl, pentyl, cyclohexyl, isooctyl, tert-butyl and the like, but also such alkyl and alkoxy chains bearing such conventional substituents in the art as hydroxyl, alkoxy, phenyl, halo (F,Cl,Br,I), cyano, nitro, amino, etc. A "central nucleus" is any compound having that structure, with any degree of substitution leaving the structure intact.

Many of these materials are well-known in the dyeing art. The performance of the dye mixtures of this invention in diffusive thermal imaging systems is demonstrated in the following examples, with particular reference to image light stability, cyan image density, and image hue error and turbidity.

The values of the above mentioned hue error and turbidity are values obtained following the evaluation method of GATF (Graphic Arts Technical Foundation), the details of which are described in, for example, GATF-Bulletin 509 "Color Separation Photography". Briefly, the evaluation method compares the deviation of the ideal color of a process ink to that of the practical color by use of the density values obtained by three kinds of filters of blue, green, and red, and is the method broadly used in the field of printing. In this method, density value is calculated from the reflectance of the measured light when passing through the filter, and when the lowest density is made L (Low), the highest value H (High) and the middle value M (Middle) the hue error and turbidity can be calculated from the following equations:

Hue error=(M-L/H-L)×100%

Turbidity=(L/H)×100%

These examples are intended to be illustrative, but not limiting. The dye mixtures are useful and effective in a variety of other embodiments of thermal dye transfer imaging known to those with skill in the art. For example, additional dyes or materials particularly absorptive of laser light used for imaging can be present in the element.

EXAMPLES

The following is a description of the various coating formulations referred to in the examples of this patent. All donor dyes were coated with a number 12 wirewound coating rod (0.027 mm wet thickness) onto 4.5 micron Toyo Metallizing TTR-101 TM (TR-101) thermal transfer backside coating system, which is representative of a thin polyester film, and dried in a current of air at ambient temperature. DNP T-1 receptor sheets were obtained commercially from Dai Nippon Printing, Tokyo, Japan.

Geon 178 TM PVC was purchased from BF Goodrich, Cleveland, Ohio. Vitel PE-200 TM polyester was purchased from Goodyear Tire and Rubber Company, Akron, Ohio. Troysol CD-1 TM was purchased from Troy Chemical Corporation, Newark, N.J. Tetrahydrofuran was purchased from Baxter Healthcare Corporation, Muskegon, Mich., and contained 250 ppm BHT(butylated hydroxytoluene) as preservative. The 3-dicyanomethylidene-2,3-dihydothiophen-1,1-dioxide derivatives can be prepared as described in U.S. Pat. No. 4,281,115. Dye I (where $R_1$, $R_2$=n-hexyl, and $R_3$=methyl) was purchased from Sandoz Chemicals, Charlotte, N.C., as Foron Brilliant Blue S-R TM. It was recrystallized from methanol before use. The 1,4-bis-(arylamino) anthraquinone dyes (dye II) can be prepared as described in Volume 3, 2nd edition of the "Colour Index" on page 3497 for C.I. Solvent Green 3. Dye III was purchased as Kayaset Blue 714 TM from Nippon Kayaku Company Limited, Tokyo, Japan. Troysol CD-1 TM (GAS Reg. No. 64742-88-7, Troy Chemical, Newark, N.J.) was used as a dispersing agent. RD-1203 (a 60/40 blend by weight of octadecylacrylate and acrylic acid, 3M, St. Paul, Minn.) was used as a low adhesion backsize.

Donor Sheet A

The donor sheet was made from the following formulation:

| | | |
|---|---|---|
| 0.425 | | dye II (where $R_5$, $R_8$ = methyl, and $R_4$, $R_6$, $R_7$, and $R_9$ are hydrogen atoms) |
| 0.637 | g | dye I (where $R_1$, $R_2$ = n-hexyl, $R_3$ = methyl) |
| 0.775 | g | Geon 178 PVC |
| 0.078 | g | Vitel PE-200 polyester |
| 0.162 | g | RD-1203 |
| 0.075 | g | Troysol CD-1 |
| 52.7 | g | tetrahydrofuran |
| 0.679 | g | methyl ethyl ketone |

Donor Sheet B

The donor sheet was made from the following formulation:

| | | |
|---|---|---|
| 0.425 | g | dye II (where $R_5$, $R_8$ = n-butyl, and $R_4$, $R_6$, $R_7$, and $R_9$ are hydrogen atoms) |
| 0.637 | g | dye I (where $R_1$, $R_2$ = n-hexyl, $R_3$ = methyl) |
| 0.775 | g | Goodyear Geon 178 PVC |
| 0.078 | g | Vitel PE-200 polyester |
| 0.162 | g | RD-1203 |
| 0.075 | g | Troysol CD-1 |
| 52.7 | g | tetrahydrofuran |
| 0.679 | g | methyl ethyl ketone |

Donor Sheet C

The donor sheet was made from the following formulation:

| | | |
|---|---|---|
| 0.425 | g | dye II (where $R_5$, $R_8$ = n-heptyloxy, and $R_4$, $R_6$, $R_7$, and $R_9$ are hydrogen atoms) |
| 0.637 | g | dye I (where $R_1$, $R_2$ = n-hexyl, $R_3$ = methyl) |
| 0.775 | g | Goodyear Geon 178 PVC |
| 0.078 | g | Vitel PE-200 polyester |
| 0.162 | g | RD-1203 |
| 0.075 | g | Troysol CD-1 |
| 52.7 | g | tetrahydrofuran |
| 0.679 | g | methyl ethyl ketone |

For comparison, donor sheets D and E were made using dye III instead of dye II.

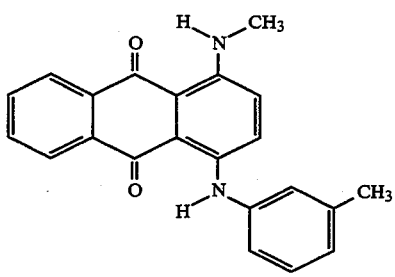

III

Donor Sheet D

The donor sheet was made from the following formulation:

| | | |
|---|---|---|
| 0.425 | g | dye III |
| 0.637 | g | dye I (where $R_1$, $R_2$ = n-hexyl, $R_3$ = methyl) |
| 0.775 | g | Goodyear Geon 178 PVC |
| 0.078 | g | Vitel PE-200 polyester |
| 0.162 | g | RD-1203 |
| 0.075 | g | Troysol CD-1 |
| 52.7 | g | tetrahydrofuran |
| 0.679 | g | methyl ethyl ketone |

Donor Sheet E

The donor sheet was made from the following formulation:

| | | |
|---|---|---|
| 0.878 | g | dye III |
| 0.183 | g | dye II (where $R_1$, $R_2$ = n-hexyl, $R_3$ = methyl) |
| 0.775 | g | Goodyear Geon 178 PVC |
| 0.078 | g | Vitel PE-200 polyester |
| 0.162 | g | RD-1203 |
| 0.075 | g | Troysol CD-1 |
| 52.7 | g | tetrahydrofuran |
| 0.679 | g | methyl ethyl ketone |

Receptor Sheet

The receptor was 3M Desktop ™ Color Proofing Base, which was used as received, with dye transfer to the coated side.

Printer

The printer used was that employed in the 3M Rainbow ™ Desktop Color Proofing System.

Example 1

Donor sheet A, described above, was imaged onto the receptor sheet using the desktop printer described above. The image densities using each of the blue, green, and red filters was measured so that hue error and turbidity could be calculated. The transferred images were then exposed in a light box at 5000 flux for 168 hours at 25° C. The change after 168 hours in (L*,a*,b*) color coordinates, DELTA E, was determined. A DELTA E of less than 2.0 is not discernable with the human eye. Hue error and turbidity were also calculated. The results are included in Table I.

Example 2

Donor sheet B was imaged and tested in the same way as described for donor sheet A in example 1. The results are shown in Table I.

Example 3

Donor sheet C was imaged and tested in the same way as described for donor sheet A in example 1. The results are shown in Table I.

Example 4 (Comparative Example)

Donor sheet D was imaged and tested in the same way as described for donor sheet A in example 1. The results are shown in Table I for comparison with examples 1, 2, and 3.

Example 5 (Comparative Example)

Donor sheet E, which utilizes a 4.8/1.0 ratio of a blue anthraquinone dye to dye II (as described in U.S. Pat. No. 4,720,480) was imaged and tested in the same way as described for donor sheet A in example 1, for comparison with examples 1, 2, and 3. The results are shown in Table I.

TABLE I

| Example | delta E | cyan density | hue error | turbidity |
|---------|---------|--------------|-----------|-----------|
| 1 | 2.2 | 2.1 | 17 | 18 |
| 2 | 1.2 | 2.1 | 18 | 15 |
| 3 | 1.6 | 2.0 | 19 | 15 |
| 4* | 1.8 | 2.4 | 22 | 11 |
| 5* | 3.2 | 2.0 | 24 | 17 |

*These examples provided for comparison.

The results show that the lowest hue errors and delta E values are found within the group described in this invention. Example 4 has high cyan density, but high hue error. Example 5, the comparison example provided from the art, has the highest delta E, the highest hue error, and maximum density of 2.0. Importantly, examples 4 and 5 show that even when using differing ratios of dye III and dye I, the hue error is greater than those for examples 1-3.

A plot of a* and b* at various burn levels for the thermal head shows that at high burn levels (to obtain high density images), the a* component of the color shifts away from the green so that the image is blue rather than cyan.

What is claimed is:

1. A cyan thermal dye transfer imaging dement comprising a continuous layer of a mixture of two or more dyes comprising at least one blue dye having a central nucleus represented by the following formula (I):

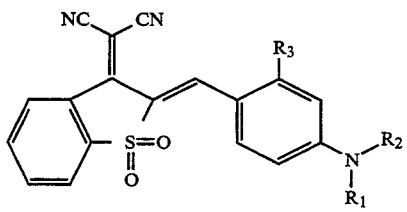

I wherein $R_1$ and $R_2$ each represents a hydrogen atom or C1–C16 alkyl group, and $R_3$ represents a hydrogen atom or C1–C6 alkyl group and at least one green dye having a central nucleus represented by the following formula (II):

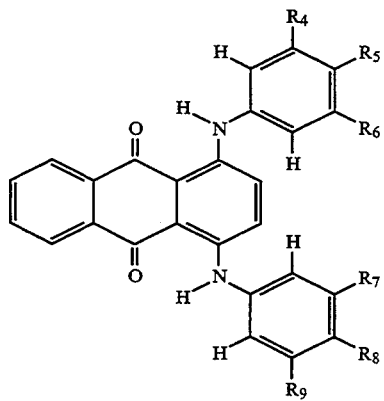

II wherein $R_4$ through $R_9$ each represents a hydrogen atom, an alkyl group, an alkoxy group, an aralkyl group, or an aryloxy group in a polymeric binder, said mixture comprising up to 99% by weight of the total weight of dye and binder, said continuous layer being bonded to a substrate.

2. A thermal dye transfer element according to claim 1 in which $R_1$ and $R_2$ are n-hexyl and $R_3$ is a methyl group, and $R_5$ and $R_8$ are methyl groups and $R_4$, $R_6$, $R_7$, and $R_9$ are hydrogen atoms.

3. A thermal dye transfer element according to claim 1 in which $R_1$ and $R_2$ are n-hexyl and $R_3$ is a methyl group, and $R_5$ and $R_8$ are n-butyl groups and $R_4$, $R_6$, $R_7$, and $R_9$ are hydrogen atoms.

4. A thermal dye transfer element according to claim 1 in which $R_1$ and $R_2$ are n-hexyl and $R_3$ is a methyl group, and $R_5$ and $R_8$ are n-heptyloxy groups and $R_4$, $R_6$, $R_7$, and $R_9$ are hydrogen atoms.

5. A thermal dye transfer imaging element of claim 1 comprising a continuous layer of a mixture of two or more dyes comprising at least one blue dye represented by the following formula (I):

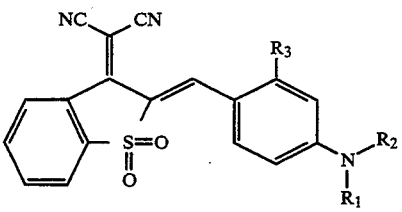

I wherein $R_1$ and $R_2$ each represents a hydrogen atom or C1–C16 alkyl group, and $R_3$ represents a hydrogen atom of C1–C6 alkyl group and at least one green dye represented by the following formula (II):

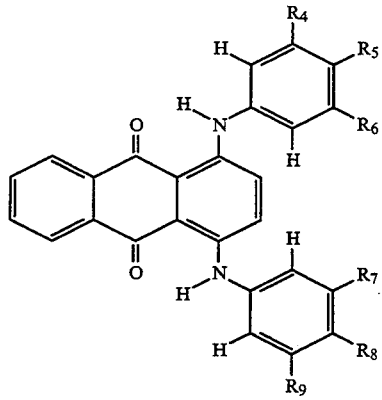

II wherein $R_4$ through $R_9$ each represents a hydrogen atom, an alkyl group, an alkoxy group, an aralkyl group, or an aryloxy group in a polymeric binder, said mixture comprising up to 99% by weight of the total weight of dye and binder, said continuous layer being bonded to a substrate.

6. A process for thermal dye transfer imaging of a cyan image comprising the steps of placing the continuous layer of an element comprising a continuous layer of a mixture of dyes in a polymeric binder, said mixture comprising up to 99% by weight of the total weight of dye and binder, said continuous layer being bonded to a substrate, said mixture comprising at least one blue dye represented by the following formula (I):

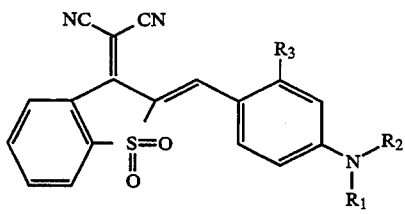

wherein $R_1$ and $R_2$ each represents a hydrogen atom or C1-C16 alkyl group that may be substituted, and $R_3$ represents a hydrogen atom or C1-C6 alkyl group and at least one green dye represented by the following formula (II):

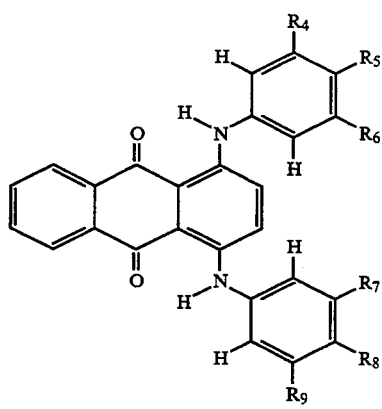

wherein $R_4$ through $R_9$ each represents a hydrogen atom, an alkyl group, an alkoxy group, an aralkyl group, or an aryloxy group in a polymeric binder, said mixture comprising up to 99% by weight of the total weight of dye and binder, said continuous layer being bonded to a substrate, and placing the continuous layer of the element against a receptor sheet and imagewise heating the substrate to transfer said mixture to said receptor sheet.

7. A process for thermal dye transfer imaging comprising the steps of placing the continuous layer of the element of claim 6 against a receptor sheet and imagewise heating the substrate so as to transfer said mixture to said receptor sheet at a temperature of 400° C. or less with a transfer time of from 0.1 to 100 milliseconds.

8. The thermal dye transfer imaging process of claim 6 wherein said dyes of said mixture are both free of ionic or ionizable, water-solubilizing groups.

9. The thermal dye transfer imaging process of claim 6 wherein said substrate has a thickness of less than 12 microns.

10. A process for thermal dye transfer imaging of claim 6 comprising the steps of placing the continuous layer of an element comprising a continuous layer of a mixture of dyes in a polymeric binder, said mixture comprising up to 99% by weight of the total weight of dye and binder, said continuous layer being bonded to a substrate, said mixture comprising at least one blue dye represented by the following formula (I):

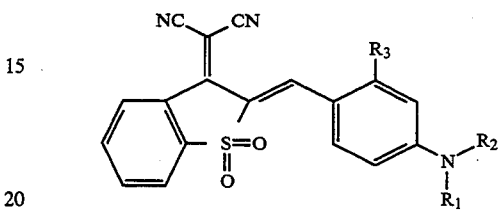

wherein $R_1$ and $R_2$ each represents a hydrogen atom or C1-C16 alkyl group that may be substituted, and $R_3$ represents a hydrogen atom or C1-C6 alkyl group and at least one green dye represented by the following formula (II):

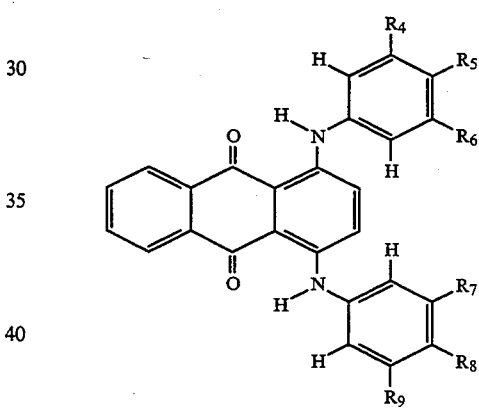

wherein $R_4$ through $R_9$ each represents a hydrogen atom, an alkyl group, an alkoxy group, an aralkyl group, or an aryloxy group in a polymeric binder, said mixture comprising up to 99% by weight of the total weight of dye and binder, said continuous layer being bonded to a substrate.

* * * * *

UNITED STATES PATENT AND TRADEMARK OFFICE
CERTIFICATE OF CORRECTION

PATENT NO. : 5,405,822
DATED : April 11, 1995
INVENTOR(S) : Landgrebe et al.

It is certified that error appears in the above-indentified patent and that said Letters Patent is hereby corrected as shown below:

Column 8, line 64, delete "(GAS Reg." and insert
--(CAS Reg.--.
Column 11, line 19, delete "bum" and insert --burn--.
Column 11, line 20, delete "bum" and insert --burn--.
Column 11, line 25, delete "dement" and insert --element--.

Signed and Sealed this

Eighteenth Day of July, 1995

Attest:

BRUCE LEHMAN

*Attesting Officer*           *Commissioner of Patents and Trademarks*